United States Patent [19]

Gerber et al.

[11] Patent Number: 4,503,425
[45] Date of Patent: Mar. 5, 1985

[54] INDICATING ARRANGEMENT FOR PORTABLE ELECTRIC DEVICES

[75] Inventors: Hans Gerber, Luterbach; Ivan Hidveghy, Zuchwil, both of Switzerland; Günter Schaal, Stuttgart, Fed. Rep. of Germany; Marian Stürmer, Leinfelden, Fed. Rep. of Germany; Eberhard Vogel, Dettenhausen, Fed. Rep. of Germany; Claude Wessel, Brügg, Switzerland

[73] Assignee: Robert Bosch GmbH, Stuttgart, Fed. Rep. of Germany

[21] Appl. No.: 166,458

[22] Filed: Jul. 7, 1980

[30] Foreign Application Priority Data

Aug. 17, 1979 [DE] Fed. Rep. of Germany ... 7923500[U]

[51] Int. Cl.³ .............................................. G08B 21/00
[52] U.S. Cl. .................................. 340/680; 340/521; 340/691
[58] Field of Search .............. 340/680, 679, 672, 671, 340/521, 691

[56] References Cited

U.S. PATENT DOCUMENTS

| | | | |
|---|---|---|---|
| 3,626,367 | 12/1971 | Howard et al. | 340/521 |
| 4,034,335 | 7/1977 | Harazoe et al. | 340/679 |
| 4,126,855 | 11/1978 | Alms et al. | 340/521 |
| 4,189,726 | 2/1982 | Rosa et al. | 340/689 |
| 4,254,412 | 3/1981 | Togneri | 340/521 |

Primary Examiner—Glen R. Swann, III
Attorney, Agent, or Firm—Michael J. Striker

[57] ABSTRACT

A portable electric device in which a surveying arrangement is incorporated for permitting a reading of the corresponding operating condition. The surveying arrangement consists of a visual reading instrument which is arranged on the casing so as to be within the range of vision and which is indicating respective characteristic data of the corresponding operating condition.

5 Claims, 4 Drawing Figures

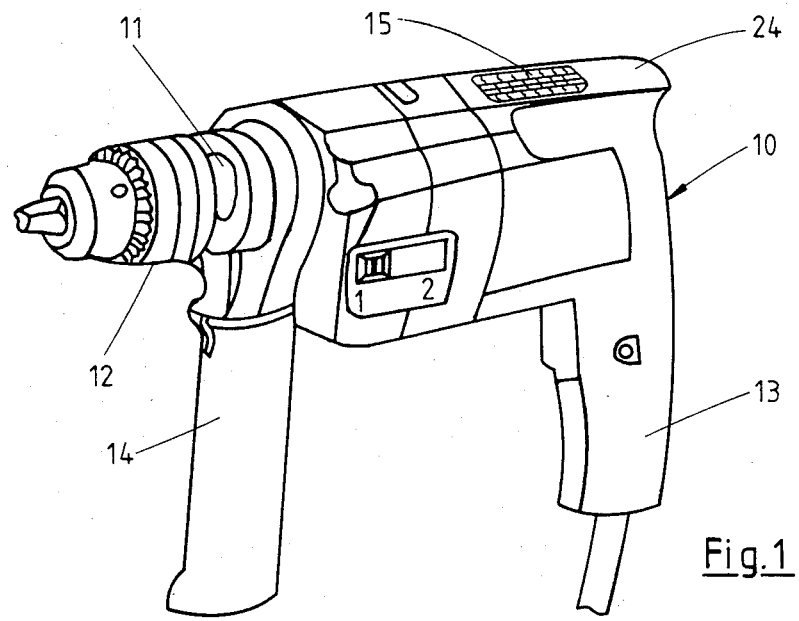
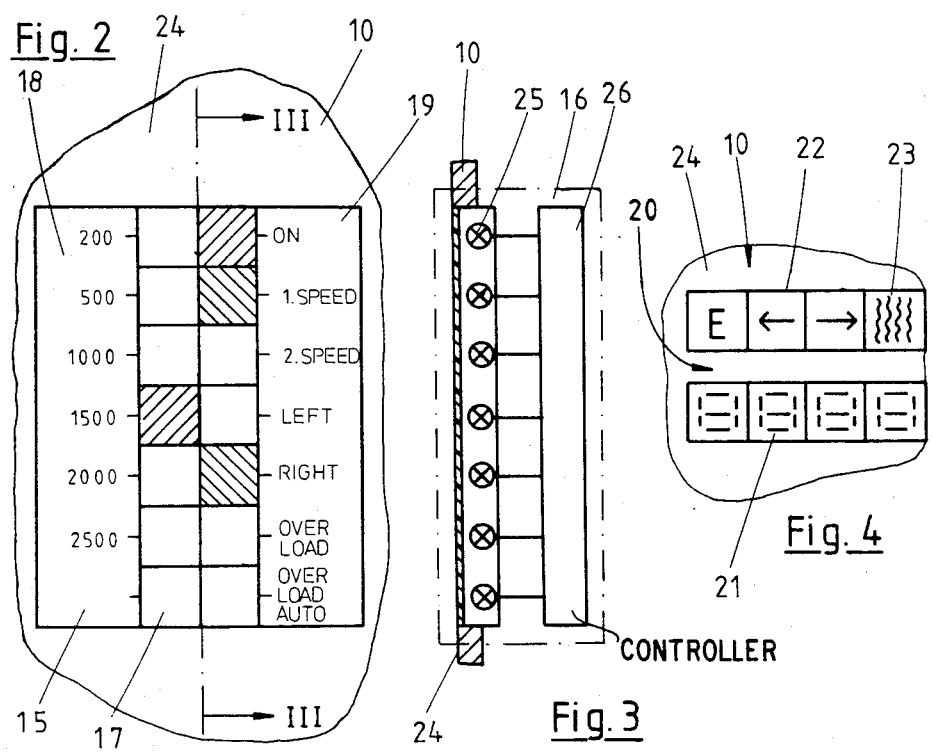

INDICATING ARRANGEMENT FOR PORTABLE ELECTRIC DEVICES

BACKGROUND OF THE INVENTION

The invention relates to an indicating arrangement for portable electric devices like a hand drilling machine, milling machine, sewing machine or the like.

Known portable electric devices are usually equipped with a number of revolving lever switches or toggle switches in order to adjust the desired operating condition. These switches are arranged on the housing different locations wherein the respectively adjusted operating condition of the portable electric device is indicated by the position of the individual switches. Although it is desired to permit an adjusting of the operating conditions in view of the efficiency and durability of the electric device, the manner of controlling the respective conditions is very complicated since it is not possible to survey all positions of the switches at a glance. This requirement, however, is necessary in order to execute a proper control of the electric device. Consequently, troubles or damages of the electric device are frequently obtained due to erroneous evaluations of the operating condition of the electric device. Thus, not only the efficiency of the device deteriorates but also an operator is endangered during occurrence of trouble.

SUMMARY OF THE INVENTION

Accordingly, it is an object of the invention to overcome the difficulties of the prior art.

More particularly, it is an object of the invention to provide a portable electric device which permits a surveying of the operating condition at a glance.

A concomitant object of the invention is to provide a portable electric device in which the surveying arrangement is simple in construction and reliable in operation nevertheless.

In keeping with these objects and with others which will become apparent hereafter, one feature of the invention resides, briefly stated, in a surveying arrangement for portable electric devices which comprises a visual reading instrument for permitting a reading of the corresponding operating conditions.

Through the provision of such a reading instrument permits a continuous visual surveying of the operating conditions of the portable electric device.

According to another feature of the invention, the visual reading device is arranged on the upper portion of the casing so that the reading is within the range of vision. Thus, the operator is able to determine the operating condition of the electric device at a glance during the initiating of the device or even during the drilling operation. Since a continuous control is possible and any changement of the operating condition can be noticed, any undesired occurrences are prevented. For example, when the operator intends to drill with a low speed, it is prevented that suddenly a very high speed unexpectedly occurs upon executing of a drilling operation. Thus, the material to be processed as well as the portable electric device is protected against otherwise obtained damages. Simultaneously, the safetly of the operator is increased through the provision of a visual reading instrument according to the invention since, for example, an error re the rotational direction of the electromotor is foreclosed which, if it happened, can considerably endanger the operator when using a combination device, e.g. milling machine or sewing machine. By providing an optical indication of an overload, the efficiency of the electric device is considerably increased wherein simultaneously the electric device is never overstrained and the danger of an accident is diminished. In the case that the operator is ignoring the indication of an overload, the electric device is equipped with an automatic overload protection which stops the electric device upon continuation of this operating condition. However, in the usual case, the operator is reducing the power demanded from the electric device upon indication of the overload, thereby achieving a proper use of the device and reducing the danger of accident by the sudden disconnection through the overload protection. Accordingly, also a damaging of the material due to the unexpected disconnection is prevented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a perspective view of a hand-drilling machine;

FIG. 2 shows a first embodiment of a visual reading instrument in enlarged scale disposed on the hand drilling machine according to FIG. 1;

FIG. 3 is a section along the line III—III in FIG. 2; and

FIG. 4 is a second embodiment of the visual reading instrument in enlarged scale.

DESCRIPTION OF THE PREFERRED EMBODIMENTS

In FIG. 1, a hand drilling machine is illustrated as for example a portable electric device, and having a casing 10 which carries a drill spindle 11 projecting from the front of the casing. The drill spindle 11 supports a chuck 12 for mounting a drill bit and is driven in a known manner by an electric motor (not shown) through interposing a transmission gear (not shown). At its rear bottom side, the casing 10 is provided with a molded handle 13 which is in a shape of a pistol grip. In addition to the handle 13, the drilling machine can be provided with a further handle 14 fixed adjacent the drill spindle 11 at the front of the casing for facilitating the drilling operation.

The casing 10 has an upper portion 24 in which a monitoring arrangement 16 is incorporated. The monitoring arrangement is schematically indicated in FIG. 3 by a dash-dotted line and is provided with a visual reading instrument. As can be seen from FIG. 2, the visual reading instrument or optical indicator 15 is subdivided into a plurality of individually defined sections 17 disposed side by side and tandem joint. Each row of tandem joint sections 17 is associated to a scale 18 or 19, respectively, having a series of markings used for reading the value of the operating condition. Accordingly, the scale 18 arranged on the left side in FIG. 2 indicates the respective rpm in revolution/minutes while the scale 19 on the right side in FIG. 2 is indicating further characteristic data about the operating condition of the hand drilling machine. The meanings of the individual characteristic data are as follows: "ON" means on-off switching of the hand drilling machine, "1.SPEED" and "2.SPEED" refer to claver first speed and a liftor second speed, "LEFT" and "RIGHT" counterclockwise rotation or clockwise rotation of the drill spindle 11, "OVERLOAD" warning of overload of the electromotor and "OVERLOADAUTO" indicating of the automatic overload protection.

Turning now to FIG. 3, there is shown that each of the sections 17 is selectively illuminated by a pilot lamp 25. Each of the pilot lamps 25 is directly arranged below the section 17 corresponding to the development and they are preferably constructed as luminous diodes. By means of a control circuit 26 which can be as a micro-computer or also a pure matrix encoder, the individual pilot lamps 25 are selectively controlled corresponding to the present operating condition of the hand drilling machine. For example, when the hand drilling machine is initiated by starting with the first speed and the drill spindle 11 is running with a rpm of 1,500 U/min in clockwise direction, the shaded sections 17 of the reading instrument 15 are illuminated as shown in FIG. 2. Thus, the operator can read the operating condition at a glance through the optical indication.

As already mentioned, the visual reading instrument 15 is incorporated within the upper portion 24 of the casing 10 opposite to the handle 13, so as to be within the range of vision and is preferably incorporated in such a manner that the instrument is flush with the upper portion 24.

Referring now to FIG. 4 in which a second embodiment of a monitoring arrangement is illustrated. The monitoring arrangement is provided with a visual reading instrument 20 which contains a seven-segment display 21 and a symbol scale 22 having individual symbols 23 which can be selectively illuminated corresponding to the operating condition. This reading instrument 20 is arranged in the same manner on the upper portion 24 of the casing 10 opposite to the handle 13. The seven-segmental display 21 indicates the rpm of the drill spindle 11 while the other characteristic data of the hand drilling machine are indicated by respective illumination of one or several of the individual symbols. Accordingly, "E" means the machine is initiated, "←" or "→" counterclockwise rotation or clockwise rotation of the machine and the individual symbol 23 shown on the right in FIG. 4 indicates the overloading.

It will be understood that each of the elements described above, or two or more together, may also find a useful application in other types of surveying arrangements differing from the types described above.

While the invention has been illustrated and described as embodied in a surveying arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hand-held electric tool, comprising a casing having an upper portion;
   a hand grip downwardly protruding from said casing; and an indicator mounted in said upper portion and having a visual indicator portion, said casing having an upper wall, said indicator portion being postioned on said upper wall in a region thereof which is opposite to said hand grip, said indicator portion being subdivided into a plurality of sections for permitting a continuous reading of different characteristic data corresponding to the operating conditions of the tool, the sections being selectively illuminated by luminous diodes.

2. A tool as defined in claim 1, wherein the indicator portion is flush with said upper wall to be always within the range of vision of an operator.

3. A tool as defined in claim 1, wherein said indicator is provided with a controller for controlling said luminous diodes.

4. A tool as defined in claim 3, wherein said controller comprises a microcomputer.

5. A tool as defined in claim 3, wherein said controller comprises a matrix encoder.

* * * * *